(12) United States Patent
Gruber (10) Patent No.: US 12,222,701 B2
(45) Date of Patent: Feb. 11, 2025

(54) CONTROL DEVICE WITH GUARD MODULE

(71) Applicant: Pilz GmbH & Co. KG, Ostfildern (DE)

(72) Inventor: Winfried Gruber, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 595 days.

(21) Appl. No.: 17/508,952

(22) Filed: Oct. 22, 2021

(65) Prior Publication Data

US 2022/0128965 A1 Apr. 28, 2022

(30) Foreign Application Priority Data

Oct. 23, 2020 (DE) .......................... 102020128026.2

(51) Int. Cl.
*G05B 19/406* (2006.01)
*H04L 41/046* (2022.01)

(52) U.S. Cl.
CPC .......... *G05B 19/406* (2013.01); *H04L 41/046* (2013.01); *G05B 2219/50193* (2013.01)

(58) Field of Classification Search
CPC ........ G05B 19/406; G05B 2219/50193; H04L 41/046
See application file for complete search history.

(56) References Cited

U.S. PATENT DOCUMENTS 10,567,191 B2    2/2020  Pohl
11,841,776 B2*  12/2023  Deka ..................... G06F 13/122

2007/0285950 A1   12/2007  Nakamura et al.
2011/0128046 A1    6/2011  Korrek
2016/0217088 A1    7/2016  Veil et al.
2017/0116145 A1*   4/2017  Scholz .................. G06F 13/385
(Continued)

FOREIGN PATENT DOCUMENTS

DE      102008029948 A1    1/2010
EP         3455681 B1      8/2019
(Continued)

OTHER PUBLICATIONS

Siemens AG, Simatic ET 200SP Fail-safe Module F-CM AS-i Safety ST (3RK7136-6SC00-0BC1) Manual, Edition Mar. 2017, Nurnberg, Germany.
(Continued)

*Primary Examiner* — Gary Collins
(74) *Attorney, Agent, or Firm* — Miller Johnson (57) ABSTRACT

A control device for controlling a technical installation includes a guard module. The control device has a modular structure with an input module, which receives an input signal representing a state of the technical installation, and an output module, which outputs an output signal controlling the technical installation based on the input signal. A guard module is integrated into the modular structure to monitor operability of the input module and the output module. The guard module confirms the output signal of the output module based on its monitoring of the input module and the output module. Within the modular structure, the input module and the output module form a first potential group. The guard module forms a second potential group within in the modular structure. The second potential group is independent of the first potential group.

18 Claims, 4 Drawing Sheets

(56) References Cited

U.S. PATENT DOCUMENTS

| | | | |
|---|---|---|---|
| 2018/0101156 A1 | 4/2018 | Kumar KN et al. | |
| 2019/0050300 A1* | 2/2019 | Cagnacci | G06F 11/1629 |
| 2019/0073326 A1 | 3/2019 | Veil et al. | |
| 2020/0173895 A1* | 6/2020 | Pope | F16P 3/003 |
| 2021/0247281 A1* | 8/2021 | Tremblay | G01N 3/08 |

FOREIGN PATENT DOCUMENTS

| | | |
|---|---|---|
| JP | 2007312573 A | 11/2007 |
| WO | 2015052174 A1 | 4/2015 |

OTHER PUBLICATIONS

Siemens AG, Simatic ET 200SP Distributed I/O system System Manual, Dec. 2015, Nurnberg, Germany.

* cited by examiner

CONTROL DEVICE WITH GUARD MODULE

CROSS-REFERENCE TO RELATED APPLICATIONS

This application claims priority to German Application No. 10 2020 128 026.2 filed Oct. 23, 2020, the entire disclosure of which is incorporated by reference.

FIELD

The present disclosure relates to safety control systems and more particularly to a modular control device, a guard module for such a control device, and a corresponding method.

BACKGROUND

Control devices are known in the field of automation technology. They perform control over technical installations such as machines or processes. A distinction is made between link-programmed controllers, which perform open-loop and closed-loop control tasks by means of hard-wired logic, and programmable logic controllers (PLC), which are freely programmable and can thus perform various open-loop and closed-loop control tasks. Due to their flexibility and adaptability, the latter have become the standard for complex or dynamically changing control tasks in process and automation technology.

A control device is called modular if it is a single unit made up of individual components, each performing a specific task. Generally, a control device comprises at least one central processing unit, which is also referred to as the head module. The head module usually forms the first module in a row of modules, which further includes at least one input module and at least one output module. The term "peripheral module" is used in the following for either input or output modules if a distinction is not necessary. The input modules are connected to encoders or sensors in order to determine a state of the technical installation. The output modules provide outputs connected to actuators in order to control the technical installation according to the desired control task and based on the states of the inputs.

Special control devices are safety controllers (also failsafe (FS) controllers). Safety controllers perform the same functions as normal control devices, but differ in that they also perform safety-related tasks. Safety controllers arose primarily from the desire to be able to interconnect safety by programming in a similar way to a standard controller. In terms of function, safety controllers differ only slightly from controllers for standard tasks. Internally, however, safety controllers have additional hardware and software for the safety-related functions.

In simple terms, a safety controller can consist of two standard controllers that run an application program in parallel, use the same process image of the inputs/outputs and constantly synchronize with each other. Among other things, a safety controller is defined by at least two separate channels, a diversified structure with different hardware, continuous testing of inputs and outputs, continuous comparison of user data, voltage and time monitoring, and safe shutdown behavior in the event of a fault or danger.

A special type of failure that safety controllers are confronted with are so-called common cause failures (CCF)—i.e., failures that occur as a result of a single cause of failure or a single event. Common cause failures are significant when they remove redundancy from a safety-related subsystem, and thus preventing the execution of a safety function. For safety controllers, whose basic principle is to provide redundancy, the detection and exclusion of common cause failures is therefore of great importance.

SUMMARY

It is an object of the present disclosure to provide a control device that is better protected against common cause failures. Further, it is an object to provide a control device that is protected against common cause failures while being flexibly adaptable. Yet further, it is an object to specify a way to reduce failures due to common cause failures that can be easily retrofitted to existing control equipment.

According to one aspect of the present disclosure, there is provided a control device having a modular structure for controlling a technical installation, the control device comprising: an input module configured to receive an input signal representing a state of the technical installation, an output module configured to output an output signal controlling the technical installation based on the input signal, and a guard module integrated in the modular structure and configured to monitor operability of the input module and of the output module and, as a function thereof, confirm the output signal of the output module, the input module and the output module forming a first potential group within the modular structure, and the guard module forming a second potential group, independent of the first potential group, within the modular structure.

According to a further aspect of the present disclosure, there is provided a guard module for monitoring operability of an input module and an output module of a control device having a modular structure, the guard module comprising: a bus module part configured to receive state information from the input module and the output module, a logic module part configured to evaluate the state information from the input module and the output module, an output module part configured to confirm an output signal of the output module based on the evaluation, wherein the input module and the output module form a first potential group within the modular structure, and wherein at least the logic module part of the guard module forms a second potential group within the modular structure, the second potential group being independent of the first potential group.

According to a further aspect of the present disclosure, there is provided a method of controlling an technical installation, the method comprising:
providing a control device having a modular structure with at least one input module and one output module;
receiving an input signal via the input module, the input signal representing a state of the technical installation;
outputting an output signal via the output module, the output signal controlling the technical installation based on the input signal;
integrating a guard module into the modular structure, the guard module monitoring operability of the input module and the output module;
forming a first potential group within the modular structure, the first potential group comprising the input module and the output module; and
forming a second potential group, independent of the first potential group, within the modular structure comprising the guard module.

It is thus an idea to provide, in a modular control device, at least one module as a guard module defining its own potential group separated from a potential group of the other modules. The guard module is configured to monitor directly or indirectly operability of one or more modules of the other potential group. "Operability" in this context means that the modules are in a condition in which they can perform their proper operation.

A potential group in the context is defined by a group of modules sharing a common voltage potential or accessing a common voltage supply. The common voltage potential may be a common operating voltage supply or may refer to a shared peripheral voltage supplied to or from the modules. "Common" in this context means that the same potential is applied to different modules and that the modules can make use of the same potential. A potential group that is separate or independent from this potential group is a potential group that is at least galvanically separated from this potential group. A module that belongs to a different potential group accesses a different voltage potential than the first voltage potential and operates independently of the first potential. The guard module can have its own operating voltage supply or receive a peripheral voltage from a different supply source than the modules of the other potential group.

The guard module or at least some parts thereof are therefore galvanically isolated from the other modules in the modular structure. At the same time, the guard module can be coupled with the other modules in order to monitor and, if necessary, act on them. The guard module and the other modules may be interconnected via communication interfaces, by means of which at least the guard module can determine a state of the other modules in order to influence the process controlled by the other modules as a function of the detected state. The communication interfaces are arranged in such a way that they do not break the separation of the first potential group and the second potential group. In other words, the modules of the first potential group and the second potential group can influence each other on a logical level without being fed by the same potential or without having to resort to a common peripheral voltage for the control.

The modular structure with an additional guard module in the manner described above has the advantage that a fault or irregularity caused by the potential defining the potential group has no influence on the function of the guard module of the other potential group. Furthermore, the guard module is configured to confirm at least the output signal of the one output module or several output modules of the other potential group. Thus, in the event of a fault that is triggered by a potential defining the first potential group and thus affects all modules, the guard module can continue to have a controlling effect on the technical installation and transfer it into a safe state. For example, the guard module can transfer the system to a safe state by switching off the outputs, and thus shutting down the technical installation. Errors that can be traced back to the defining potential of a potential group, e.g. caused by a defective power supply or an overvoltage, can be controlled in this way. The proposed approach thus effectively eliminates another source of common cause errors.

The guard module is integrated into the modular structure of the control device like any other module. Modifications to the control device itself are therefore not necessary. The additional guard function can thus be implemented cost-effectively and efficiently. Furthermore, existing modular control devices can easily benefit from the additional protection against common cause faults. The guard module thus not only extends the scope of protection of new control devices, but also serves to supplement older control devices with this function. In addition, the guard module can be used flexibly and for different applications due to its seamless integration into the modular structure.

In a further refinement, the first potential group may provide the output signal and the second potential group may provide an enable signal to acknowledge the output signal.

The output signal and a signal confirming it (enable signal) thus originate from different potential groups. A fault in one of the potential groups therefore does not lead to a loss of control, since a redundant signal is provided from another potential group.

In a further refinement, the input module, the output module and the guard module can each comprise a bus module part via which the input module, the output module and the guard module are connected to one another, the bus module part of the guard module having a galvanic isolation which is galvanically isolates the bus module part of the guard module from further components of the guard module.

For the guard module, this refinement means that galvanic isolation takes place within the guard module at the transition to the bus module part. The bus module part, via which communication with the other modules of the modular structure can be realized, is thus assigned to the first potential group, which is different from the potential group of the guard module. This refinement allows the guard module to be easily integrated into existing control devices, even if the control devices have a backplane common to all modules that provides the communication link between the modules. The galvanic isolation thus takes place in the guard module and is transparent to the rest of the control device.

In a further refinement, the input module and the output module can be configured to send state information to the guard module at defined intervals, with the guard module being configured to confirm the output signal as a function of the state information sent.

In this refinement, the guard module can thus operate according to the principle of a "watchdog". Only if the guard module receives a "heartbeat signal" as a sign of life of the input or output module, the guard module confirms the output signal and thus allows the operation of the technical installation. Such a watchdog principle is easy to implement without hardware adaptation of the input and output modules.

In a further refinement, the first potential group may comprise, in addition to the input module and the output module, one or more further modules which are relevant to a provision of the output signal and which are each configured to transmit the signal at the defined intervals, wherein the guard module is configured to confirm the output signal in dependence on the reception of the signals from all relevant modules.

The guard module can thus monitor several modules. Among other things, the guard module may also monitor a head module comprising a central processing unit. For a large number of modules in a potential group, only a single guard module is needed to implement the additional protection against common cause faults. In this way, the implementation is possible in a very efficient manner.

In a further refinement, the guard module may include a first supply terminal to be connected to a potential forming the second potential group.

The guard module may thus comprise a suitable connection for coupling to a power supply via which the guard module receives the potential defining the second potential group. The guard module can thus have a supply connection that is independent of the rest of the control device. This can be, for example, a 24V connection commonly used in automation technology. The potential defining the second potential group may be identical in nature to the potential defining the first potential group.

In a further refinement, the guard module may comprise an output module configured to provide the output signal for the output module of the first potential group.

According to this refinement, the guard module may directly influence the output module by providing a potential for providing the output signal. Instead of confirming the output signal via another signal of its own, in this case confirmation takes place by the guard module either providing the potential for the output module or not. Among other things, this simplifies cabling of the control device to the peripherals, since the output module can be connected to the peripherals unchanged. It is not necessary to combine the individual signals of the output module and the guard module.

In a further refinement, the guard module may have a second supply terminal for this purpose that feeds the output module part, wherein the output module part is electrically isolated from the guard module. Thus, to power the output module, the output module part may have another power supply terminal. A first terminal thus supplies a logic module part of the guard module and the second terminal supplies the output module part. The output module part and the logic module part are galvanically isolated from each other. At the same time, the logic module part and the output module part are coupled and integrated into a module such that the logic module part can control the output module part. The logic module part is configured to switch on or off, via the output module part, the provision of a potential to the output modules coupled to the output module part of the guard module.

In another refinement, the guard module is of multi-channel redundant design.

As is common with safe (peripheral) modules, the guard module can thus have a logic module part of redundant design to monitor its own operation. In this way, the guard module can meet the requirements of a high safety category and make faults within the module controllable.

It is understood that the above features, and those to be explained below, may be used not only in the combination indicated in each case, but also in other combinations or alone, without departing from the scope of the present invention.

BRIEF DESCRIPTION OF THE DRAWINGS

Embodiments of the invention are shown in the drawings and are explained in more detail in the following description.

DETAILED DESCRIPTION

Figure 1:
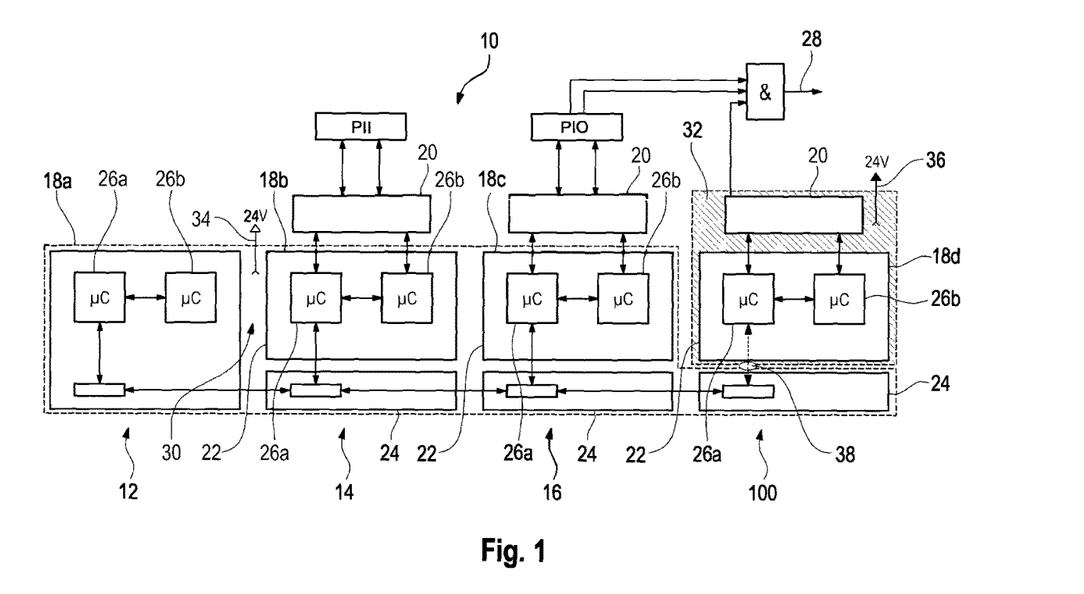
FIG. 1 shows a schematic representation of a first embodiment of a control device having a guard module.

FIG. 1 shows a first example embodiment of a control device having a guard module. The control device is designated in its entirety by reference numeral 10.

The control device 10 has a modular structure. In the present embodiment, the control device comprises four individual modules. The first module is a head module 12, the second module is an input module 14, the third module is an output module 16, and the fourth module is a guard module 100.

The modules may each be housed in their own housing (18a-18d) and combined to form the control device 10. The order in which the modules are arranged is initially irrelevant and the modules do not have to be arranged in the order shown here. However, it is also conceivable that in another embodiment the order of the modules arranged next to each other is of importance for defining the role of the respective module. In addition, the number of modules is not limited to the four modules shown here. The control device 10 may include a plurality of other input and output modules (peripheral modules) in addition to the typically single header module. Further modules with other functions than the input and output shown here are also conceivable. These other modules can benefit from the guard module in an equivalent manner. While being modular, the control device 10 forms a single unit.

The modules of the control device may themselves also be modular. The modular structure of the individual modules is hereinafter referred to as vertical modularity, while the modular structure of the control device consisting of the individual modules is referred to as horizontal modularity.

A module may include an input/output module part 20, a logic module part 22, and a bus module part 24 integrated into a single module.

The input/output module part 20 of a module implements the physical interface to the periphery to acquire a process image of the inputs (PII) and to set outputs with respect to a process image of the outputs (PIO). An input/output module part comprises a plurality of terminals for connecting sensors and actuators to receive input signals from sensors and encoders, on the one hand, and to provide output signals to actuators, on the other hand. Input and output can be redundant, as indicated here by the double arrow.

The logic module part 22 of a module forms the core of a module. In this module part, the actual signal processing (logic) takes place by means of corresponding signal processing devices 26. The processing includes the evaluation of the detected states as well as the determination of the reaction to be carried out depending on the evaluation. Signal processing can be performed by microcontrollers (μC), but is not limited to such. Other signal processing devices such as CPU, GPU, ASIC, etc. are equally conceivable. For error prevention and/or detection, the modules may include two or more signal processing devices 26, as indicated herein by the suffixes a and b for each module. The signal processing devices 26 may process or generate the input and output signals in parallel, and may synchronize and monitor each other. This is also referred to as multi-channel redundant design. A multi-channel redundant design of the individual modules is a known design for providing a fail-safe facility.

The bus module part 24 forms the communication interface to the other modules. In addition to a communication link to the signal processing devices 26 of a module, the bus module part 24 includes respective cross-connections to adjacent bus module parts of adjacent modules. In this way, the bus module parts 24, which are connected side by side, form a communication bus through which the modules of the control device can communicate with each other. The signal processing devices 26 of the input module 14, the output module 16, and the guard module 100 can exchange data via the bus. Similarly, the head module 12 may exchange data with the other modules via the bus. The bus module parts 24 are each formed here as module parts of the individual modules. However, it is also conceivable that the bus module parts 24 are formed as a single backplane which is coupled to the head module and onto which the individual modules can be plugged.

The guard module 100 has a similar structure to a peripheral module, and accordingly can be integrated into the modular structure of the control device like any other peripheral module. Like the peripheral modules, the guard module 100 has at least one logic module part 22 and a bus module part 24. Further, in various embodiments, the guard module 100 may have an input/output module part 20.

The signal processing devices 26 of the guard module 100 exchange data and signals with the peripheral modules 14, 16 and the head module 12. As will be described below, the guard module 100 monitors the proper operation of the peripheral modules 14, 16 and the head module 12. In the event of proper operation of the peripheral modules 14, 16 and the head module 12, the guard module 100 confirms the output signals of the output modules. To this end, the guard module 100 may include a dedicated output module part that provides an additional output signal depending on the signal processing of the logic module part. The confirmation of the output signals of the output modules of the control device may then be performed by an "AND" operation of these output signals, so that a linked output signal 28 is generated only when the output signal of the guard module and the output signals to be confirmed are present at the "AND" operation. It is understood that this is only one way of confirming the output signal.

The control device 10 comprises two potential groups. Here, the first potential group 30 includes the header module 12, the input module 14, and the output module 16. The second potential group 32 includes the logic module part and the output module part of the guard module 100. In FIG. 1, the second potential group 32 is highlighted by the shaded area.

A first supply voltage terminal 34 feeds the first potential group 30 and is arranged, for example, on the head module. A second supply terminal 36 feeds the second potential group 32 and is arranged on the guard module 100. The associated potentials of the potential groups 30, 32 can be identical in nature and can be 24V, for example, as shown here. Furthermore, the potential groups 30, 32 are independent of each other and galvanically isolated from each other within the control device. It is understood that a separation of the potential groups 30, 32 is not limited to the separation shown here, as long as at least the output signal of the guard module is fed from a different potential group than the output signals of the modules to be monitored.

By forming the guard module as an independent module, a separation of the potential groups 30, 32 can be easily achieved. The guard module only needs to communicate with the other modules. By means of a corresponding communication interface with isolation 38, this is possible without removing the galvanic isolation of the potential groups. The isolation 38 of the communication interface can be implemented, for example, by means of an optocoupler which enables signal transmission between two electrically isolated circuits. An optocoupler is usually formed by a light-emitting diode (LED) or laser diode (LD) as optical transmitter and a photodiode or phototransistor as optical receiver.

In the embodiment shown in FIG. 1, the isolation 38 of the communication interface is disposed between the logic module part 22 and the bus module part 24. It is understood that other arrangements of the isolation 38 are also conceivable. In another embodiment, the isolation 38 may also be integrated into the bus module part 24, for example, wherein each of the cross-connections includes a galvanic isolation.

Figure 2:
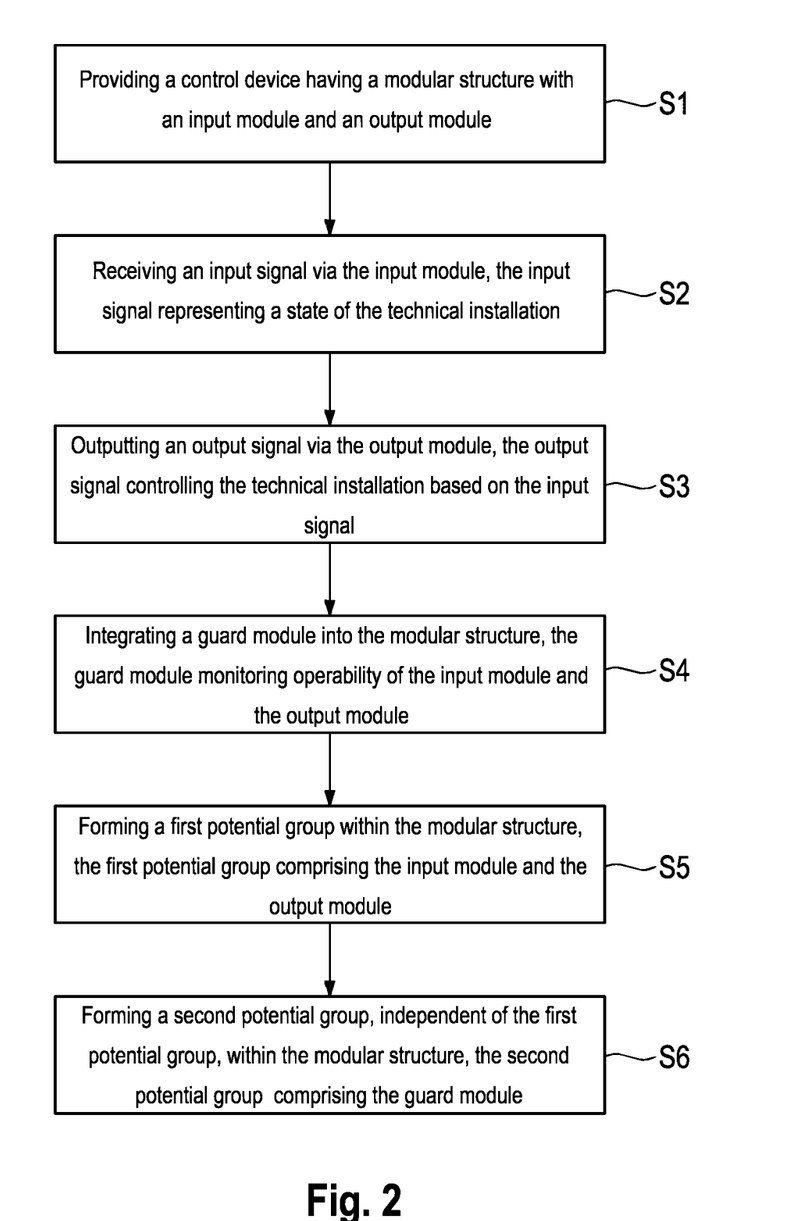
FIG. 2 shows a schematic representation of an embodiment of a method for controlling a technical installation with a control device having a guard module.

With reference to FIG. 2, the operation of the control device 10 is described in more detail below. FIG. 2 shows a schematic representation of an embodiment of a method for controlling a technical installation with a control device having a guard module.

The method comprises, in a first step (S1), providing a control device having a modular structure according to an embodiment of the present disclosure. The control device comprising at least one input module and one output module.

Via the input module, the control device receives at least one input signal (S2) representing a state of the technical installation. The input signal can be a signal from a safety sensor, e.g. a light barrier or an emergency stop switch. The sum of the input signals results in the process image of the inputs (PII) and thus reflects the state of the technical installation.

Via the output module, the control device outputs at least one output signal for controlling actuators. The sum of the output signals is determined by the process image of the outputs (PIO). For example, the actuators can be contactors in a power supply of the technical installation, which only release a power supply of the technical installation if the output signal is present. It is understood that shutting down the technical installation is only one way of transferring the technical installation into a safe state. In another embodiment, the output signal may also trigger another control function that moves the technical installation into a safe position without de-energizing the technical installation itself.

Furthermore, the method includes integrating a guard module into the modular structure of the control device (S4). The guard module is configured to monitor at least the operability of the peripheral modules, i.e. the input module and the output module. In another embodiment, the guard module may also monitor other modules, for example, the head module. Details of the monitoring process are explained in more detail below.

The last steps of the method (S5, S6) involve the formation of defined potential groups within the modular structure. The separate potential groups enable independent monitoring of the modules by the guard module, so that faults in the power supply of certain modules cannot affect other modules in the same way.

In step S5, a first potential group comprising at least the peripheral modules is formed. The first potential group is defined, for example, by applying a supply voltage to a supply terminal of the modules.

In step S6, a second potential group comprising the guard module is formed. The second potential group is independent of the first potential group within the modular structure of the control device. The guard module thus has at least one circuit, galvanically isolated from the other modules, for monitoring as well as for providing confirmation of the output signal. The guard module can be coupled to a supply voltage via a further supply terminal to form the second potential group.

An example of a monitoring process of the guard module is described below. According to this example, the guard module operates according to the principle of a "watchdog". According to this principle, the modules to be monitored continuously emit a signal at defined intervals to indicate the module's operability. Such a signal is also called a "heartbeat" signal. Only if the guard module receives the heartbeat signal as expected, the guard module agrees to the output of the control device. Enabling can be done, for example, by an "AND" operation of an output signal of the guard module with the outputs of the control device, so that operation is only permitted if all output signals of both the control device and the guard module are present. If the guard module does not receive a heartbeat signal, it will not confirm the output of the control device. Thereby, the technical installation is transferred into a safe state or the technical installation remains in such a state. It can be achieved, for example, by the outputs of the control device driving contactors in a power supply of the technical installation, which only pick up and supply the technical installation with a power in the presence of an output signal of the control device. If, on the other hand, the contactors fall off because there is no output signal, the technical installation is de-energized and therefore not dangerous for a person anymore. It is understood that the described process is only one example of how a safe state of a technical installation can be achieved. Further procedures are known from the field of safety engineering as to how a safe state can be established with the aid of an output signal. The control device proposed herein is not limited to any particular procedure.

Likewise, the watchdog principle is only one way of monitoring the modules. In addition to the direct monitoring of individual peripheral modules, indirect monitoring can also be implemented, for example. In the case of indirect monitoring, only one module (e.g. the head module of the control device) is monitored in accordance with the above principle on behalf of the other modules. If, for example, the head module is configured to monitor the associated peripheral modules and to switch off the outputs in the event of a fault, it may be sufficient to monitor only the head module in order to enable indirect monitoring of the peripheral modules.

Furthermore, in another embodiment, the guard module may also be arranged to emit a heartbeat signal to indicate its own operability to the other modules of the control device. For example, the guard module may send a heartbeat signal to a head module of the control device and the head module causes the outputs to be turned off if the heartbeat signal is not received as expected. In this way, the other modules monitor the guard module and cause a safe state to be assumed if a fault should occur in the guard module's potential group. Accordingly, the modules of the control device and the guard module can monitor each other, whereby common cause failures can be better detected due to the fact that the modules of the control device and the guard module belong to separate potential groups.

Confirmation by the guard module can be achieved in the manner described above. In other words, the guard module has its own output module part and provides its own output signal depending on the monitoring of the other modules. The output signal of the guard module can be linked to the actual output signals of the control device. An alternative embodiment is described below with reference to FIG. 3.

Figure 3:
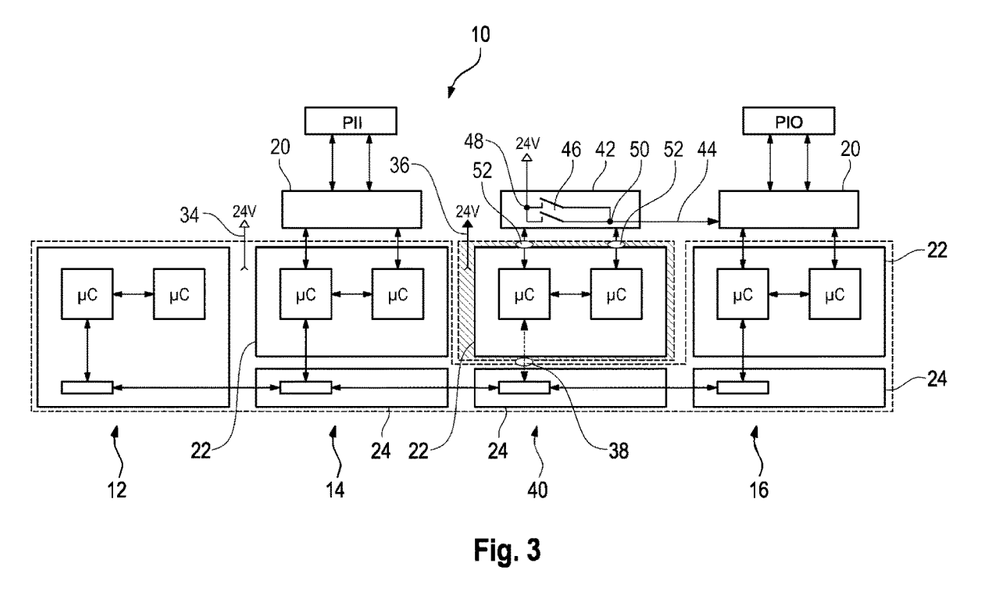
FIG. 3 shows a schematic representation of a second embodiment of a control device with a power supply module that performs the function of a guard module.

FIG. 3 shows a schematic representation of a second embodiment of a control device with a power supply module that performs the function of a guard module. Same reference numerals denote the same parts as before in FIG. 1.

Like the embodiment according to FIG. 1, the embodiment according to FIG. 3 comprises a control device 10 having a head module 12, an input module 14 and an output module 16. The modules operate and communicate with each other in the manner previously described with reference to FIG. 1. Likewise, the modules are combined in the modular structure to form a first potential group in the manner described above. The head module 12, the input module 14, and the output module 16 are fed by a first supply voltage terminal 34.

In contrast to the previous embodiment according to FIG. 1, the control device 10 according to the embodiment according to FIG. 3 has an additional power supply module 40. The power supply module 40 is configured to receive an external peripheral voltage and to make it available to the peripheral modules for providing the output signals. The output modules 16 of the control device can thus feed their output signals from the external peripheral voltage without having to rely on the voltage supply of the control device. With the help of power supply modules, a control device can be easily scaled, since the number of outputs is not limited by the control device's own power supply.

The power supply module 40 includes an input/output module part 42 configured to receive and pass an external peripheral voltage to other modules. Forwarding may be accomplished by separate wiring, or it may be accomplished by special coupling of the input/output module part 42 to the input/output module part of an adjacent module. The forwarding of an external peripheral voltage is schematically indicated here by the arrow 44.

The input/output module part 42 is further configured to be able to switch on and off the forwarding. For example, the input/output module part 42 may have a switching element 46 between an input terminal 48 of the external peripheral voltage and an output terminal 50 to the adjacent modules. As shown herein, the switching element 46 may be provided redundantly.

The switching element 46 may be actuated by a logic module part 22 of the power supply module 40. In other words, the logic module part 22 of the power supply module 40 may be configured to switch on and off the forwarding of the external peripheral voltage. Only if logic module part 22 allows forwarding, the output modules can feed their output signal from the external peripheral voltage. Thus, by controlling the forwarding, the logic module part 22 can easily confirm the output signals of the dependent output modules.

According to the embodiment shown in FIG. 3, the power supply module 40 is configured such that the logic module part 22 is assigned to a different potential group than the other modules. For this purpose, a second supply terminal 36 may be provided to supply power only to the logic module part 22, as well as additional isolating means 52 to isolate the logic module part 22 from the other module parts and modules. In this way, a second potential group 32 is formed around the logic module part 22, which is independent of the first potential group 30.

The logic module part 22 may further perform the same function as the logic module part 22 of the guard module 100 shown in FIG. 1. The power supply module 40 is thus capable of performing one of the monitoring operations described above, with confirmation of the outputs being performed via controlled forwarding of the external peripheral voltage. In other words, according to the embodiment example shown in FIG. 3, a power supply module 40 can be extended to perform the tasks of a guard module by providing its own potential group. In this way, the power supply module and the guard module are integrated into one module, which means that the control device can be smaller and simpler. At the same time, effective protection against common cause faults is possible.

Figure 4:
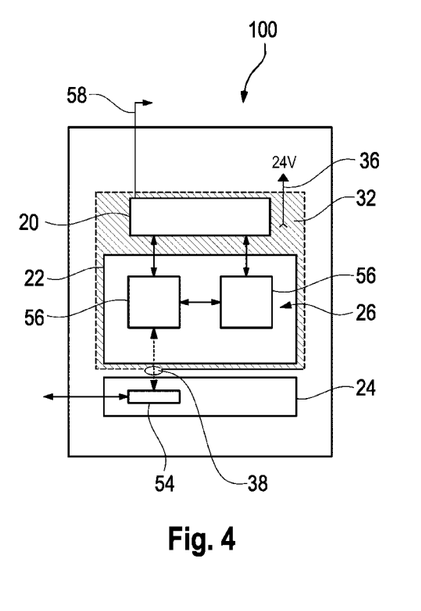
FIG. 4 shows a schematic representation of a first embodiment of a guard module for a control device.
Figure 5:
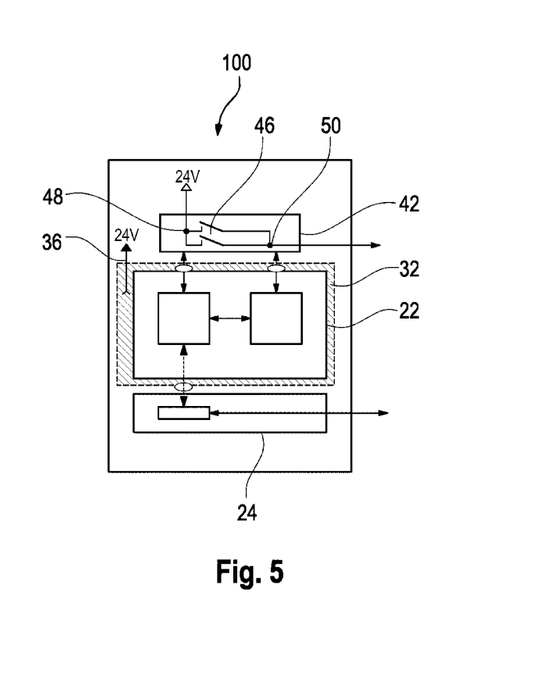
FIG. 5 shows a schematic representation of a second embodiment of a guard module in the form of a power supply module for a control device.

Finally, FIG. 4 and FIG. 5 each show an embodiment of a guard module 100.

FIG. 4 shows a schematic representation of a first embodiment of a guard module for a control device. The guard module corresponds to the guard module as described with reference to FIG. 1. Same reference numbers indicate same parts as before.

Here, the guard module 100 is a stand-alone guard module for monitoring other modules of a module arrangement. In the illustrated embodiment, the guard module comprises three module parts that may be formed as independent components and may be assembled to form the guard module. A stand-alone component in this context is one that is not specific to the guard module but can be used with other modules.

A first module part is a bus module part 24 that includes a communication interface 54. The communication interface 54 allows the bus module part to communicate with and receive signals from the modules to be monitored.

The second module part is a logic module part 22 having a signal-processing device 26. The signal-processing device 26 evaluates the signals received from the modules to be monitored and verifies the proper operation of the modules. The evaluation may be performed redundantly by two separate signal-processing units 56 that synchronize and monitor each other.

The third module part is an output module part 42. Via the output module part 42, the guard module may provide an output signal in response to the received signals. The output signal of the guard module is used to confirm one or more output signals of an output module of the control device to be monitored. The output signal may be an enable signal 58, which must be present in addition to the actual output signals of the control device in order to enable operation of the technical installation controlled by the control device.

The guard module forms an independent potential group 32 within the control device in which the module is integrated. In this context, independent means that the potential group 32 is separate and independent from a potential group from which the other modules of the control device are fed. This means that at least one circuit within the guard module, which is responsible for monitoring and enabling, is galvanically isolated from a circuit of the other modules. The separation can be achieved by an isolation 38. To generate the potential group, the guard module may have a supply terminal 34 through which the guard module 100 receives a potential defining the potential group 32.

FIG. 5 shows a schematic representation of a second embodiment of a guard module in the form of a power supply module for a control device.

The guard module according to FIG. 5 is based on the same operating principle as the guard module according to FIG. 4 and is divided into three module parts. The bus module part 24 and logic module part 22 are identical to the corresponding module parts of the guard module shown in FIG. 4, but the guard module 100 shown in FIG. 5 differs in the output module part 42.

The output module part 42 includes here a terminal 48 for receiving a potential and a terminal 50 for passing the potential to an adjacent module. An adjacent module may thus provide an output signal fed by the potential input to the output module part 42. In addition, the output module part 42 includes a switching element 46 between the terminal 48 and the terminal 50 to connect and disconnect the terminal 48 and the terminal 50. The switching element 46 may be controlled by the logic module part 22, such that the guard module 100 is configured to prevent forwarding of the injected potential. In this way, the guard module can confirm an output signal of that module which uses the injected potential to provide its output signal.

As in the case of the guard module according to FIG. 4, the logic module part 22 of the guard module according to FIG. 5 is also arranged in an independent potential group 32 in order to be able to ensure independent monitoring in the manner described above.

Both the guard module of FIG. 4 and the guard module of FIG. 5 allow a particular source of common cause faults to be effectively eliminated within a control device in which the modules are used.

As used herein, the phrase at least one of A, B, and C should be construed to mean a logical (A OR B OR C), using a non-exclusive logical OR, and should not be construed to mean "at least one of A, at least one of B, and at least one of C.

What is claimed is:

1. A guard apparatus for monitoring operability of an input module and an output module of a control device having a modular structure, the guard apparatus comprising:
   a bus module part configured to receive state information from at least one of the input module and the output module;
   a logic module part configured to evaluate the state information from the input module and the output module; and
   an output module part configured to confirm an output signal of the output module based on the evaluation,
   wherein:
   the input module and the output module form a first potential group within the modular structure, and
   at least the logic module part of the guard apparatus forms a second potential group independent of the first potential group within the modular structure.

2. A control device having a modular structure for controlling a technical installation, the control device comprising:
   an input module configured to receive an input signal representing a state of the technical installation;
   an output module configured to output an output signal which controls the technical installation based on the input signal; and
   a guard apparatus according to claim 1.

3. The control device of claim 2, wherein the first potential group provides the output signal and the second potential group provides a signal for confirming the output signal.

4. The control device of claim 2, wherein:
   the input module, the output module, and the guard apparatus each include a bus module part via which the input module, the output module, and the guard apparatus are connected to one another, and
   the bus module part of the guard apparatus includes an isolation element configured to galvanically isolate the bus module part of the guard apparatus from further components of the guard apparatus.

5. The control device of claim 2, wherein:
   the input module and the output module are configured to send state information to the guard apparatus at defined intervals, and
   the guard apparatus is configured to confirm the output signal based on the state information.

6. The control device of claim 5, wherein:
   the first potential group includes, in addition to the input module and the output module, one or more further modules relevant for providing the output signal,
   the further modules are each configured to transmit the state information at the defined intervals, and the guard apparatus is configured to confirm the output signal in response to reception of the state information of all relevant modules.

7. The control device of claim 2, wherein the guard apparatus includes a first supply terminal configured to be connected to a potential forming the second potential group.

8. The control device of claim 2, wherein the guard apparatus includes an output module part configured to provide the output signal for the output module of the first potential group.

9. The control device of claim 8, wherein:
the guard apparatus includes a second supply terminal to be connected to a further potential feeding the output module part, and
the output module part is galvanically isolated from the guard apparatus.

10. The control device of claim 2, wherein the guard apparatus is of multi-channel redundant design.

11. The control device of claim 2, wherein the control device includes a safety controller with two separate signal processing channels.

12. The control device of claim 2, wherein the control device includes a safety controller with a diversitary structure.

13. The control device of claim 2, wherein the control device includes a safety controller configured to implement voltage/time monitoring.

14. The control device of claim 2, wherein the control device is configured to test at least one of the input and the output module continuously as well as to ensure a safe shutdown behavior in case of a fault or danger.

15. The guard apparatus of claim 1, further comprising an isolation element configured to electrically isolate a circuit in the logic module part from a circuit in at least one of the output module part and the bus module part.

16. A method for controlling a technical installation, the method comprising:
providing a control device having a modular structure with at least one input module and one output module;
receiving an input signal via the input module, the input signal representing a state of the technical installation;
outputting an output signal via the output module, the output signal controlling the technical installation based on the input signal; and
integrating a guard apparatus according to claim 1 into the modular structure.

17. The guard apparatus of claim 1, wherein:
the output module includes a terminal configured to receive an external peripheral voltage, and
the output module is configured to feed the output signal using the external peripheral voltage.

18. The guard apparatus of claim 17, wherein the logic module part is configured to stop feeding of the output signal of the output module from the external peripheral voltage.

* * * * *